United States Patent
Takahashi et al.

[11] Patent Number: 6,036,124
[45] Date of Patent: Mar. 14, 2000

[54] APPARATUS FOR GASIFYING AND LIQUEFYING STYROFOAM

[75] Inventors: Kenzo Takahashi, Kamifukuoka; Kazukuni Shibata, Sagamihara; Masaya Takahashi, Hiratsuka, all of Japan

[73] Assignee: Takamo Industries Co., Ltd., Tokyo, Japan

[21] Appl. No.: 09/189,826

[22] Filed: Nov. 10, 1998

[30] Foreign Application Priority Data

Jun. 23, 1998 [JP] Japan ................................... 10-176012
Oct. 20, 1998 [JP] Japan ................................... 10-298671

[51] Int. Cl.$^7$ .................................................. B02C 19/12
[52] U.S. Cl. ................................. 241/38; 241/65; 241/79; 241/101.2; 241/DIG. 38
[58] Field of Search ................................. 241/38, 65, 79, 241/99, 101.2, 101.6, 236, DIG. 38, 24.18, DIG. 14

[56] References Cited

U.S. PATENT DOCUMENTS

| | | | |
|---|---|---|---|
| 5,042,725 | 8/1991 | Grimmer | 241/19 |
| 5,225,044 | 7/1993 | Breu | 202/113 |
| 5,641,128 | 6/1997 | Kimura et al. | 241/63 |
| 5,769,333 | 6/1998 | Kimura et al. | 241/24.18 |
| 5,842,652 | 12/1998 | Warsing et al. | 241/81 |
| 5,961,054 | 10/1999 | Nishibori | 241/19 |

Primary Examiner—John M. Husar
Attorney, Agent, or Firm—John R. Benefiel

[57] ABSTRACT

A system for gasifying styrofoam and liquefying the resulting gas to a liquid styrofoam. This system is particularly useful for disposition of the styrofoam onto which non-meltable substances adhere. The system includes a pulverizing mechanism for pulverizing a lump of styrofoam and a melting vessel for melting the pulverized styrofoam. The resulting melt is filtered by a strainer to remove the non-meltable substances. The filtered styrofoam melt is transferred to a gasifying vessel for vaporization. The styrofoam gas (combustible gas) is then condensed by a gas cooler. A gas leaking from the melting vessel to the pulverizing mechanism through the constant volume feeder is discharged by a discharge line. The styrofoam gas is a combustible gas so that it may be used as a fuel gas for a gas burner. Part or all of the styrofoam gas is condensed by the gas cooler and recovered as a fuel oil.

24 Claims, 6 Drawing Sheets

APPARATUS FOR GASIFYING AND LIQUEFYING STYROFOAM

BACKGROUND OF THE INVENTION

1. Field of the Invention

The present invention generally relates to an apparatus for gasifying styrofoam (styrene foam) and more particularly to an apparatus for gasifying styrofoam and then liquefying the resulting styrofoam gas to recover the styrofoam in the form of styrofoam oil. The styrofoam is widely used as a packaging material for industrial products, a heat insulating material for architecture, a sound proofing material and the like.

2. Description of the Related Art

As mentioned above, styrofoam is commonly utilized as a packaging material for industrial products, a heat insulating material for architecture, a sound proofing material, a material for heat insulated containers, a material for shock absorptive containers, etc. When its role is finished, the styrofoam is generally incinerated as a combustible waste.

However, the styrofoam is fabricated by adding a hydrocarbon of low boiling point to a polystyrene (styro resin) and heating them until they expand several—ten times as large. Therefore, the styrofoam is bulky when it is transported to an incinerator or when dumped in a garbage pit. Further, the styrofoam generates a large amount of soot and smoke as well as harmful gas upon incineration. This may disrupt a surrounding environment.

Paper or plastic labels are often attached to the styrofoam container. Further, some of substances placed in the styrofoam container such as foods, earth and sand remains in the styrofoam container when the role of the styrofoam container is finished. Of course, other refuses such as non-fusable materials may also adhere on the styrofoam. Thus, before the styrofoam container is incinerated, it should be washed to peel the labels or to clean the inside of the styrofoam container. This kind of operation is usually costly and troublesome.

SUMMARY OF THE INVENTION

The present invention was developed to efficiently solve the above described problems.

One object of the present invention is to provide a novel apparatus for gasifying and then liquefying styrofoam so as to recover the gasified styrofoam in the form of a fuel oil, whereby the styrofoam is effectively disposed and efficiently reused.

Another object of the present invention is to provide a novel apparatus for gasifying and liquefying styrofoam which does not need any treatment before disposition even if non-fusable substances adhere on the styrofoam before gasification.

According to one aspect of the present invention, there is provided an apparatus including a pulverizing mechanism for crushing and breaking a lump of or plate-like styrofoam into small pieces, a liquefying (melting) vessel for heating the pulverized styrofoam until it melts, a constant volume feeder located between the pulverizing mechanism and liquefying vessel for feeding the pulverized styrofoam to the liquefying vessel from the pulverizing mechanism in a predetermined amount, a strainer for filtering the styrofoam melt to remove non-fusable materials if any, a gasifying device for further heating the filtered styrofoam melt until it is vaporized, a gas cooler for cooling this vapor to a liquid (styrofoam oil) and a first discharge line for extracting a styrofoam gas, which leaks from the melting vessel to the pulverizing mechanism through the constant volume feeder, from the pulverizing vessel. The styrofoam gas is occasionally generated in the melting vessel upon heating. The styrofoam may be thrown into the pulverizing mechanism from a hopper. The hopper may be open at its top.

In general, the styrofoam is lump or it has a plate-like shape when it is thrown away as a waste. The lump of styrofoam or plate-like styrofoam is difficult to heat and melt. Thus, the lump of (or board-shaped) styrofoam is first pulverized by the pulverizing unit. Then, the small pieces of styrofoam are fed to the melting vessel from the constant volume feeder. The small pieces of styrofoam are heated by an electric heater or the like of the heating vessel. Thus, the fused styrofoam is easily obtained. After that, the fused styrofoam (or styrofoam melt) is filtered by the strainer so that non-fusable substances such as wastes and labels, which adhere on the styrofoam when the styrofoam is thrown into the pulverizing mechanism, is eliminated from the styrofoam melt. The clean melt is then transferred to the gasifying unit. The liquid styrofoam is further heated by an electric heater or the like of the gasifying unit to vaporize the styrofoam melt. The resulting gas is a comestible gas so that it may be used as a fuel gas for a gas burner. A second discharge line may extend from the gasifying unit and the gas burner may be provided at the downstream end of the second discharge line. The gasification of the styrofoam melt breaks high molecular bond so that the styrofoam gas is not solidified even if it is cooled. If the gasified styrofoam is not needed as a fuel gas, all or part of the styrofoam gas is sent to the gas cooler and cooled to an oil (liquid of styrofoam). This can be used as a fuel oil. The styrofoam is sometimes vaporized in the melting vessel upon heating. This styrofoam gas may also be fed to the gas cooler. Conventionally the styrofoam is simply incinerated to wastes. According to the present invention, however, the styrofoam can be reused efficiently. Thus, the resource is saved. In addition, the environmental disruption caused by incineration of the styrofoam is prevented. Further, since the wastes and labels attached to the styrofoam are eliminated by the strainer, cleaning and peeling works are unnecessary before the styrofoam is thrown into the pulverizing mechanism. Moreover, even if a gas leaks to the pulverizing mechanism from the melting vessel through the constant volume feeding device, this gas is discharged by the first discharge line. A combustor may be provided at the downstream end of the first discharge line so that this combustible gas is also used as a fuel gas for the combustor. Accordingly, the leakage gas which may be harmful is not discharged to the outside from the top (e.g., hopper) of the pulverizing mechanism. Thus, it is unnecessary to always close the top of the pulverizing mechanism. In other words, it is not needed to close the hopper each time the styrofoam is thrown into the pulverizing mechanism. Thus, the styrofoam may continuously be fed into the pulverizing mechanism. A heat medium may have been put in the heating vessel beforehand to prevent or minimize vaporization of the styrofoam melt upon heating.

DETAILED DESCRIPTION OF THE INVENTION

Now, embodiments of an apparatus for gasifying styrofoam and further recovering it as an oil according to the present invention will be described in reference to the accompanying drawings.

Figure 1:
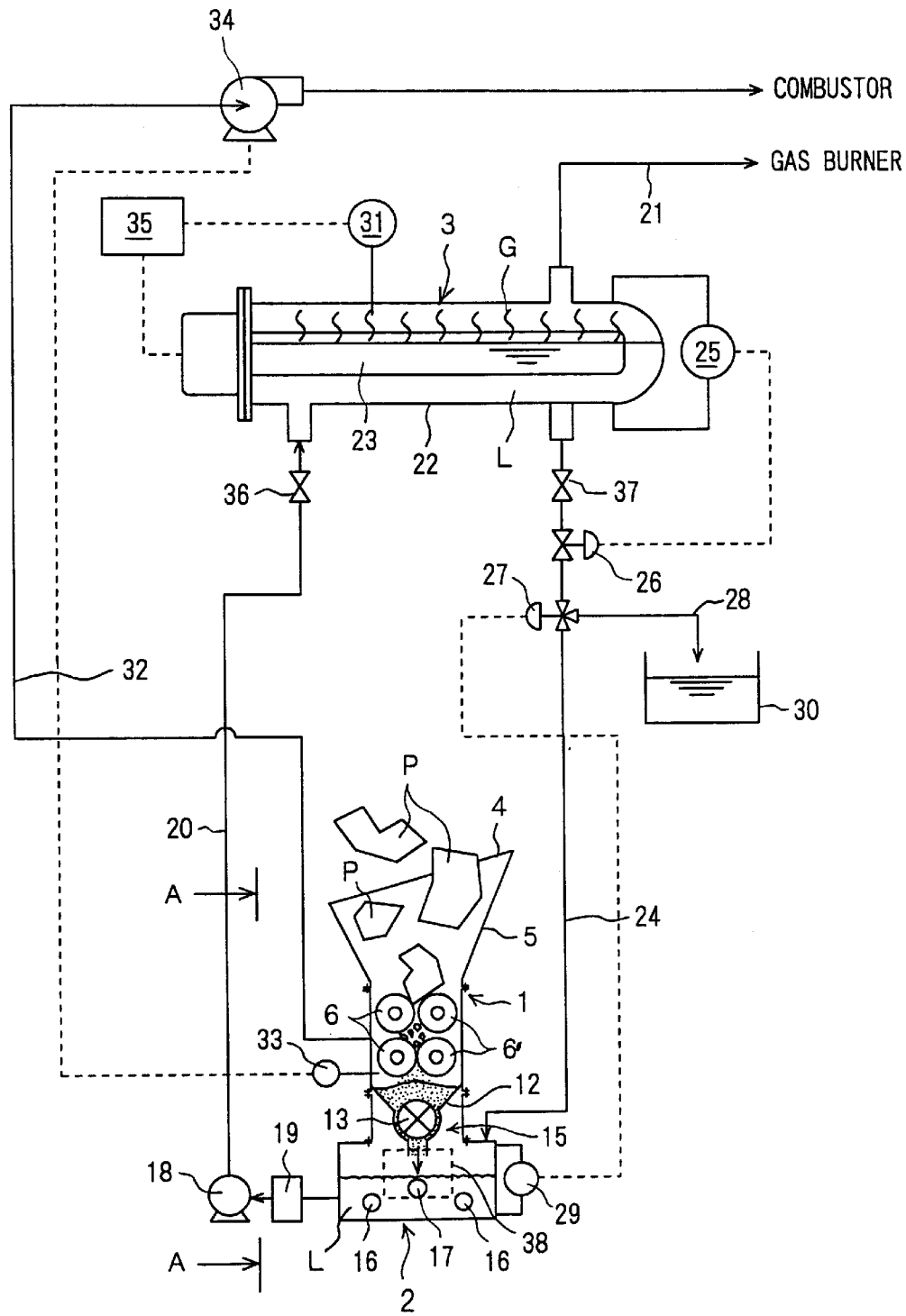
FIG. 1 diagrammatically illustrates an overall structure of an apparatus according to the first embodiment of the present invention.

Referring to FIG. 1, an apparatus for gasifying and recovering styrofoam according to the present invention includes, as its major components, a pulverizing mechanism 1 for pulverizing lumps of styrofoam P into small pieces, a constant volume feeder 15 for passing a constant volume of pulverized styrofoam therethrough, a melting (or liquefying) vessel 2 located below the constant volume feeder 15 for receiving the pulverized styrofoam and heating it to a melt L, a strainer 19 located downstream of the melting vessel 2 for filtering the styrofoam melt L to eliminate non-meltable substances such as wastes, a gasifying device 3 for further heating the filtered melt of styrofoam L to a gas G, and a discharge line 32 extending from the pulverizing mechanism 1 for discharging a gas leaking from the melting vessel 2 into the pulverizing unit 1 through the constant volume feeder 15. A gas of styrofoam may be generated in the melting vessel 2. Non-meltable substances such as wastes and labels may adhere on the styrofoam P before the styrofoam is thrown into the pulverizing unit 1. The styrofoam P may have a board shape.

The pulverizing unit 1 includes a casing 5 having a hopper 4 at its top, four pulverizing screws 6 extending in parallel transversely in the casing 5 and a drive motor 7 (FIG. 2) for actuating one of the four screws 6.

Figure 2:
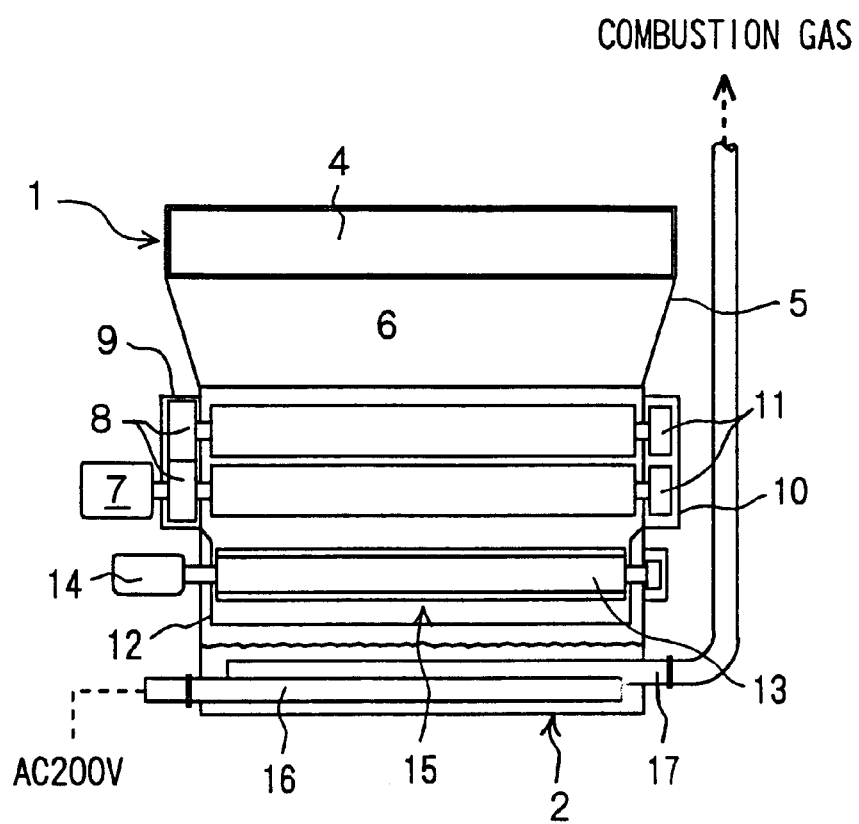
FIG. 2 is an illustration as viewed from the direction of the arrow A in FIG. 1.

Referring to FIG. 2, each of the pulverizing screws 6 has a gear 8 at one end thereof (left end in the drawing). The four gears of the four screws 6 engage with each other in a gear box 9 mounted on a side of the casing 5. Therefore, when the drive motor 7 activates one of the screws 6, all the screws 6 are driven simultaneously. A bearing box 10 is attached to the other side of the casing 5. Each screw 6 has a bearing 11 on the right end thereof, and the four bearings 11 of the four screws 6 are housed in the bearing box 10. Each screw 6 includes a rotary drum (not shown) and a plurality of crushing teeth (not shown) attached to the drum surface. Engagement between the crushing teeth pulverizes the styrofoam P.

Below the screws 6, the pulverizing unit 1 also has the pulverized styrofoam feeding mechanism 15. This mechanism includes a lower hopper 12 communicated with a lower open end of the casing 5, a rotary valve 13 situated in the lower hopper 12, and a valve motor 14 for driving the rotary valve 13. The lower end opening of the casing 5 is sealed by the hopper 12 and rotary valve 13. The styrofoam P pulverized by the pulverizing unit 1 is supplied to the melting unit 2 located below the pulverizing unit 1 by the feed mechanism 15. An amount of styrofoam to be fed to the melting unit 2 is controlled to a desired volume by the hopper 12 and rotary valve 13.

The melting unit 2 is united to the pulverizing unit 1 via the constant volume feeding mechanism 15. A heat medium or liquid agent of high boiling point is already put in the melting unit 2 to uniformly and quickly heat and fuse the styrofoam but not to gasify it. The first heating vessel 2 is also equipped with electric heaters 16 (only one heater is seen in FIG. 2) to heat the styrofoam P passing through the feeding unit 15 to or beyond its boiling point and thereby to obtain a melt thereof, and a drum-shaped burner 17 for combusting a gas produced during the heating and melting process. This gas is discharged from the burner 17 as indicated by the broken line arrow.

Referring back to FIG. 1, a feed line 20 extends from the lower portion of the melting vessel 2 to the gasifying unit 3. On the feed line 20, provided are a discharge pump 18 and the strainer 19. The pump 18 pulls the melt of styrofoam L together with the liquid agent from the vessel 2. The melt L and liquid agent are filtered by the strainer 19 and delivered to the gasifying unit 3 by the pump 18.

The melt feed line 20 extends to a closed container 22 of the gasifying unit 3 and a gas discharge line extends from the container 22 to a gas burner (not shown). Another electric heater 23 is placed in the container 22 to heat the inside of the container. The styrofoam melt L fed from the feed line 20 is temporarily stored in the closed container 22 and further heated by the electric heater 23 for gasification. The resulting combustible gas G of styrofoam is supplied to the gas burner by the gas discharge line 21.

A return line 24 also extends between the gasifying unit 3 and melting unit 2. When the volume of styrofoam melt L in the container 22 exceeds a predetermined value, a level sensor 25 functionally connected to the container 22 detects such a fact and causes a flow rate valve 26 on the return line 24 to open. Consequently, the melt L is forced to return to the first heating vessel 2 from the container 22 of the second heating vessel 3. A three-way valve 27 is also provided on the return line 24 downstream of the valve 26, and another line 28 branches from this three-way valve 27. When the styrofoam melt L is forced into the return line 24 but the styrofoam melt L in the melting vessel 2 is beyond a predetermined volume, then a level sensor 29 electrically connected to the melting vessel 2 detects such a fact and causes the three-way valve 27 to open. As a result, the returning melt L on the line 24 is partly or entirely bypassed to a pit 30 together with the liquid agent. The styrofoam melt introduced into the discharge pit 30 is indirectly cooled by water or air so that the styrofoam melt L and liquid agent are recovered in the present or different form (may be solidified upon cooling). When solidified, the styrofoam and associated agent are recovered as an ingot. The ingot of styrofoam is smaller than the liquid of styrofoam in volume.

A pressure gage 31 is functionally connected to the closed container 22 of the gasifying unit 3 to measure a pressure in the container. When the measured pressure is not in a predetermined range, the manometer 31 outputs a signal indicative of such a fact to a controller 35 adapted to control the electric heater 23. The controller 35 increases or decreases an output of the heater 23 or adjusts a heating manner by the heater 23.

The pulverizing unit 1 also has a pressure gage 33 to detect the pressure in the pulverizing unit. When the gas in the melting vessel 2 leaks to the pulverizing unit 1 through the feed unit 15 and the pressure in the casing 5 is raised over an atmospheric pressure, a fan 34 provided on the discharge line 32 is activated to vent the gas from the casing 5. This residual gas is delivered to a combustor or the like (not shown) from the discharge line 32. Reference numerals 36 and 37 designate block valves for the lines 20 and 24 respectively.

Now, an operation of the described and illustrated apparatus will be described.

A small amount of liquid agent (or medium) having a high boiling point is put into the liquefying vessel 2. The heat medium is, for example, an A oil, lubrication oil, base oil for lubrication oil, flashing oil and thermal oil. This heat medium is heated to or over the boiling point of styrofoam P, for example, about 130 to 160° C. by the electric heaters 16. Then, the lumps of styrofoam P are thrown into the pulverizing unit 1 from the hopper 4 and pulverized by the rotating screws 6. The resulting small pieces of styrofoam are allowed to fall into the melting vessel 2 in a constant volume at a time (or in a predetermined period) under the control of feeding device 15. The small pieces of styrofoam contact the hot heat medium so that they are quickly heated and melted. Accordingly, a mixture L of the liquid styrofoam and heat medium is obtained in the melting vessel 2. It should be noted that a trace amount of combustible gas may be generated upon heating of the styrofoam in the vessel 2, but this gas is burned to a harmless gas by the combustor 17 and discharged (FIG. 2). Thus, this combustible gas itself will not flow back to the feeding device 15 and pulverizing unit 1 and will not be expelled to the atmosphere. Even if such a combustible gas is generated in a large amount and flows back to the feeding unit 15 and pulverizing unit 1, this flowing back of gas is detected by the pressure gage 33 and the fan 34 forces the gas toward the combustor through the pipe 32. Therefore, a combustible gas leaking to the pulverizing unit 1 from the melting vessel 2 will not be discharged to the atmosphere from the hopper 4, and consequently will not disrupt the surrounding environment. Further, it is not needed to always close the hopper 4 every time the styrofoam P is thrown into the hopper. In other words, it is possible to continuously feed the styrofoam P into the pulverizing unit 1 or a continuous treating of the styrofoam P is enabled.

Next, the styrofoam melt L with the heat medium is drawn out of the melting vessel 2 by the discharge pump 18 and introduced into the closed vessel 22 of the gasifying unit 3 through the feed pipe 20. On the way to the gasifying unit 3, the styrofoam melt L is filtered by the strainer 19 so that the non-meltable substances such as wastes and labels are efficiently removed. Therefore, the non-meltable substances are not transferred to the gasifying unit 3 together with the styrofoam melt L. Styrofoam containers are often used to carry vegetables and fish, and paper or plastic labels, earth and sand, fish garbage, vegetable garbage generally adhere on the surface of the styrofoam container. These non-meltable substances are eliminated by the strainer 19. Consequently, a troublesome work for washing and/or removing the non-meltable substances is dispensed with. Accordingly, the disposing efficiency of the apparatus is improved.

When the filtered styrofoam melt L is transmitted to the gasifying unit 3, it is heated to or more than its boiling point (e.g., about 200–300° C.) by the inner heater 23. As a result, the styrofoam is vaporized. The combustible gas generated in the closed vessel 22 flows out of the vessel 22 from the discharge pipe 21 and reaches the gas burner, and is used as a fuel for the gas burner. Therefore, the gas G produced upon gasification of the styrofoam is effectively utilized.

A volume of gas used by the gas burner may vary. To cope with changing consumption of fuel gas by the gas burner, the electric heater 23 of the gasifying unit 3 may be adjusted. Specifically, when an amount of fuel gas needed by the gas burner changes, balance between gas generation and gas consumption is lost and the pressure in the closed vessel 22 varies. This pressure variation is detected by the manometer 31 and the controller 35 decreases or increases the output of the electric heater 23 in accordance with the changing pressure. When a less amount of fuel gas is required by the gas burner, the inner pressure of the vessel 22 rises. Then, the output of the electric heater 23 is lowered to reduce generation of the gas. Conversely, when the gas burner consumes more gas, the inner pressure of the vessel 22 drops so that the controller raises the output of the electric heater 23 to promote gas generation.

If the gas burner needs a less amount of combustible gas and an amount of styrofoam melt L passed to the gasifying unit 3 exceeds an amount of gas G passed to the gas burner from the gasifying unit 3, the liquid level is raised in the gasifying unit 3. This is sensed by the level sensor 25 attached to the gasifying device 3 and opens the flow control valve 26 so that an appropriate amount of styrofoam melt L and heat medium is returned to the melting unit 2 through the return pipe 24. In this manner, the volume of the styrofoam melt L in the gasifying vessel 3 is always maintained in a suitable range. In the meantime, an amount of styrofoam L in the melting vessel 2 increases as the melt L returns to the melting vessel 2. If the melting vessel 2 does not have an enough space or capacity to receive the returning melt L, the level sensor 29 attached to the melting unit 2 controls the three-way valve 27 on the return pipe 24 such that the styrofoam melt L is bypassed to the pit 30 by the branching pipe 28.

In sum, the solid styrofoam is pulverized, melted, gasified and used as a fuel gas for the gas burner in the present invention. As compared with the prior art which simply incinerates the styrofoam, therefore, the apparatus of the invention can efficiently reuse the styrofoam waste. In other words, limited resources on the earth are effectively utilized. In addition, the conventional apparatus generates a harmful gas upon incineration and disrupts the environment, but the present invention apparatus does not.

Although the feeding unit 15 equipped with the rotary valve 13 and other components is located in a lower portion of the pulverizing unit 1 so that it feeds the pulverized styrofoam to the melting unit 2 and seals the pulverizing unit 1 from the melting unit 2 in the illustrated embodiment, the constant volume feeding unit 15 may be dispensed with if the discharge line 32 extends from the pulverizing unit 1, as illustrated, and the size and melting capability of the melting vessel 2 are sufficiently large. In order to facilitate a cleaning work to the melting vessel 2, the melting vessel 2 may have an openable window 38 and/or an explosion door (not shown) in its side wall. Further, a styrofoam feeding door (not shown) may be provided in or near the top (ceiling) of the melting vessel 2 so that the solidified styrofoam prepared in the pit 30 is thrown into the melting vessel 2 and remelted. The electric heaters 16 and 23 may be replaced with gas burners. Part of the combustible gas G generated in the gasifying unit 3 may be used as a fuel gas for these gas burners to reduce a running cost of the apparatus as a whole.

The present invention is not limited to the above described constructions. For example, the following changes and modifications may further be made.

Figure 3:
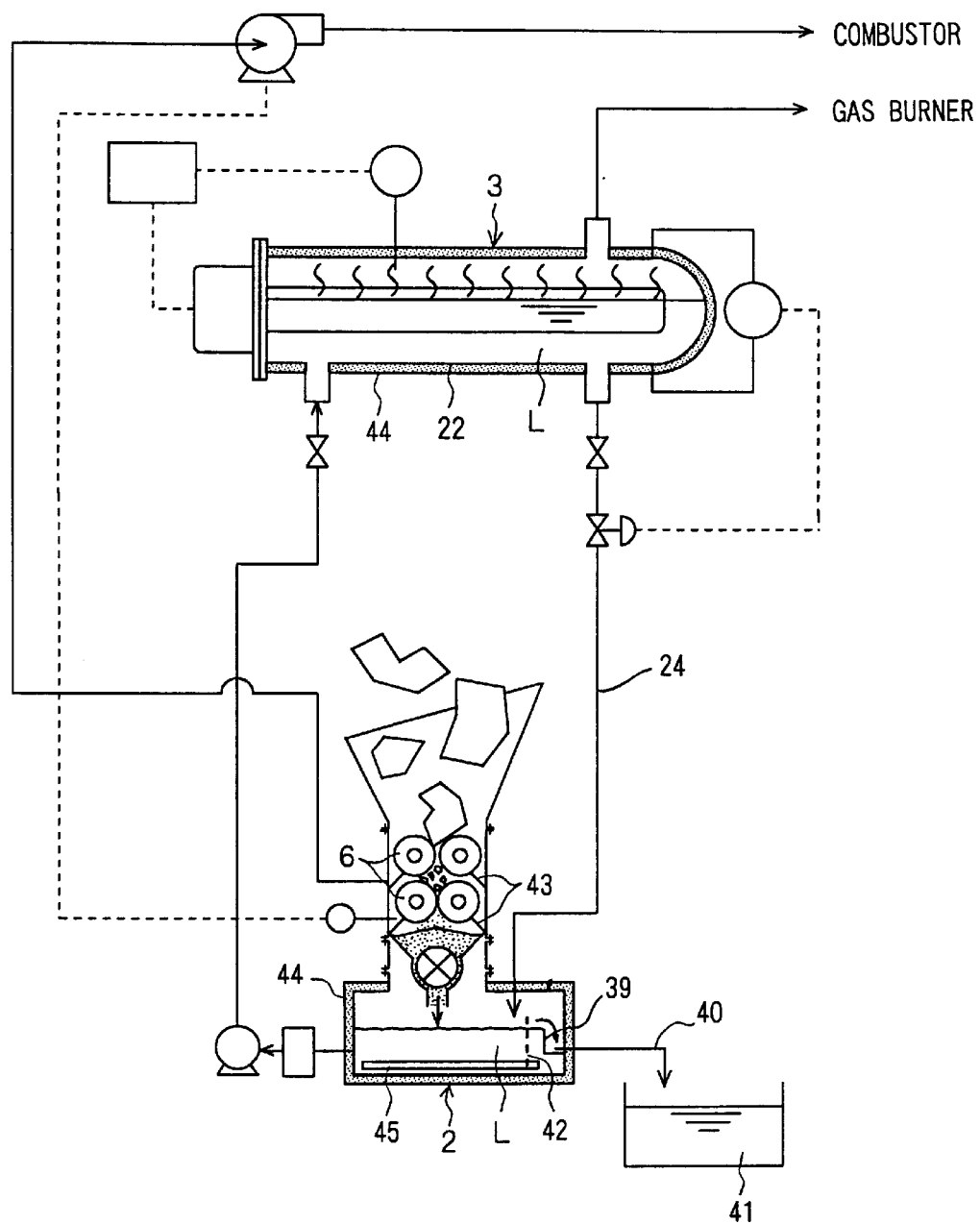
FIG. 3 schematically illustrates an apparatus for gasifying and recovering styrofoam according to the second embodiment of the present invention.

Referring first to FIG. 3, a weir 39 may be provided in the melting vessel 2 and an overflow pipe 40 may extend from the weir 39 so that a surplus styrofoam melt L in the melting vessel 2 is caused to overflow to a pit (cold water tank) 31. In this modification, the three-way valve 27, level sensor 29 and pit 30 of FIG. 1 are not necessary. Therefore, the structure of the apparatus is simplified and reliability and stability of the apparatus are improved. The styrofoam melt L introduced to the pit 41 is instantaneously solidified by the cooling water in the pit 41 so that it is reduced in volume and recovered in the form of ingot. Further, a screen 42 such as a net may also be provided near the weir 39 so that solid substances and wastes in the melting vessel 2 do not flow into the overflow pipe 40 and do not cause clogging. It should be noted that the pit 41 may be an empty tank and the styrofoam melt L introduced into the pit 41 may be indirectly cooled by water or air.

A scraper 43 like a comb may be attached to each of the screws 6 so that the small pieces of styrofoam sticking on between the teeth of the screws 6 are effectively removed. The pulverizing capability of the pulverizing unit 1 is accordingly maintained. Further, a heat insulating layer 44 may surround the melting vessel 2 and/or the gasifying vessel 3 to reduce heat radiation from these vessels. This contributes to efficient melting (liquefaction) and gasification. Instead of the rod-shaped electric heaters 16 of FIG. 1, a sheet-shaped heater 45 such as a ribbon heater or thermoelectric panel may be employed to uniformly heat the interior of the melting vessel 2 and increase the capacity (effective volume) of the vessel 2. The sheet heater is smaller than the rod heaters so that a larger amount of styrofoam melt L can be reserved in the vessel 2.

Figure 4:
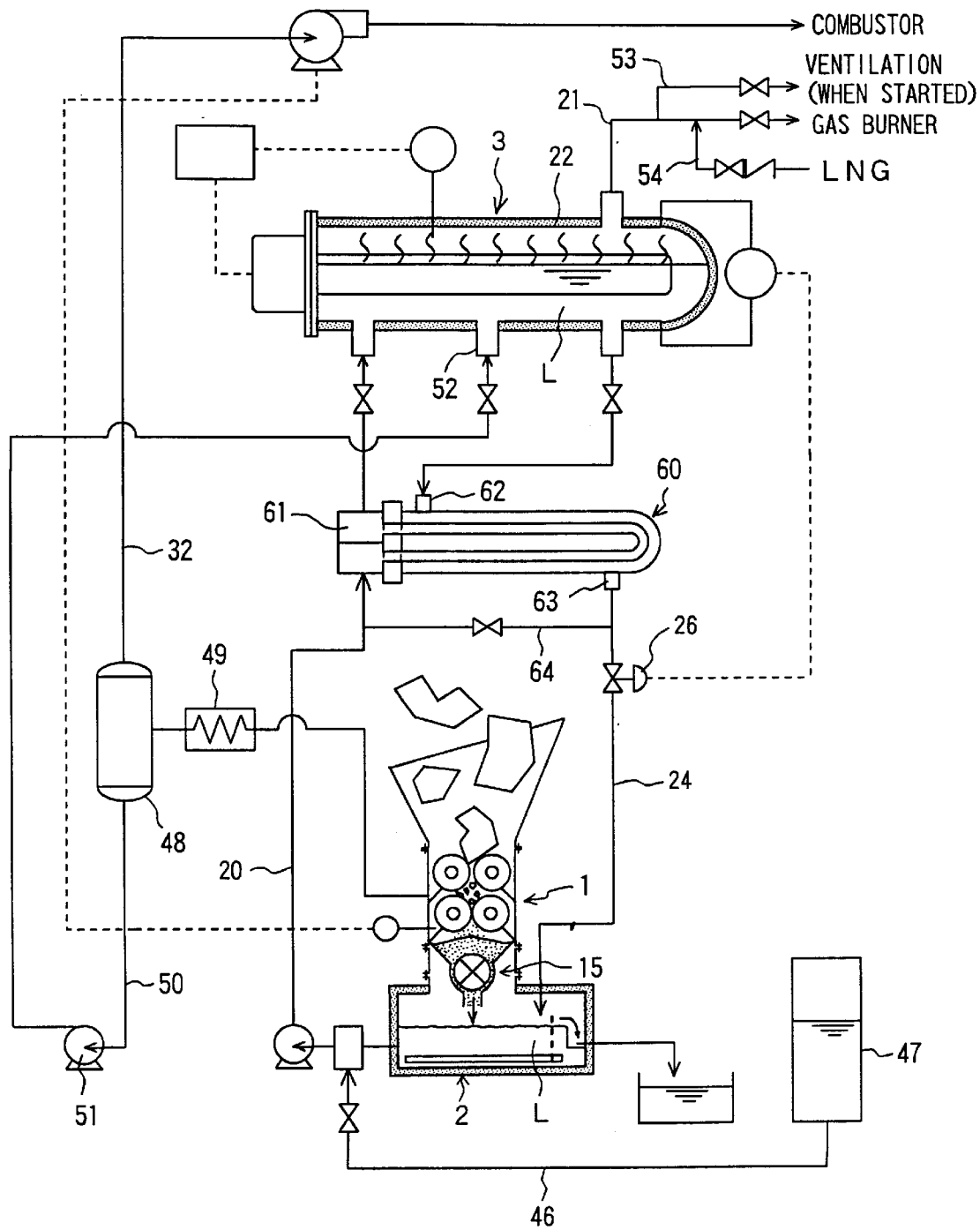
FIG. 4 diagrammatically illustrates a styrofoam gasifying and recovering apparatus according to the third embodiment of the present invention.

Another modification is illustrated in FIG. 4.

The styrofoam gasifying and recovering apparatus according to this modification further includes a heat exchanger 60 between the feed line 20 and return line 24, and a condenser 49 and a gas-liquid separator 48 on the discharge line 32 extending from the pulverizing unit 1, in addition to the components of the apparatus shown in FIG. 1. Performance and reliability of the apparatus are further improved in this modification.

The heat exchanger 60 may be a shell-and-tube type. The heat exchanger 60 includes a tube with a header 61 connected to the feed line 20, and a shell with an inlet 62 and an outlet 63 connected to the return line 24. Therefore, the styrofoam melt L flowing into the tube of the heat exchanger 60 from the melting vessel 2 through the feed line 20 is heated by the hot styrofoam melt L flowing into the shell of the heat exchanger from the gasifying unit 3 through the return line 24. The heated styrofoam melt L is fed to the gasifying unit 3 and the cooled styrofoam melt L is returned to the melting unit 2.

By providing the heat exchanger 60, therefore, a heat loss is reduced and a thermal efficiency is improved. Moreover, eliminated is a possibility that the styrofoam melt L passed to the melting unit 2 will be gasified in the melting unit 2. Therefore, stable operations and reliability of the apparatus are insured and further improved.

By providing the condenser 49 and gas separator 48 on the discharge line 32, part or all of the leakage gas forced out of the pulverizing unit 1 to the discharge line 32 is cooled and condensed by the condenser 49 before it enters the gas separator 48 for liquid-gas separation. The separated liquid is introduced to the gasifying unit 3 from an inlet 52 through an extracting line 50 by a pump 51. The remaining gas, which has not been condensed by the condenser 49, is passed to the discharge line 32 and burned by the combustor (not shown) like the apparatus shown in FIG. 1. Therefore, even if a large amount of combustible gas is generated in the melting vessel 2 (or the sealing between the melting vessel 2 and pulverizing unit 1 does not work appropriately) and a considerable amount of the gas leaks to the pulverizing unit 1, an amount of gas flowing into the gas burner is significantly reduced. In this modification, the leakage gas is efficiently utilized since it is recovered the styrofoam liquid to be fed to the gasifying unit 3 or as the styrofoam gas to be fed to the separate combustor.

Besides the foregoing, a cleaning liquid line 46 may connect to the strainer 19 of the feed line 20, and another bypass line 64 may connect the feed line 20 to the return line 24 before the feed line 20 reaches the heat exchanger 60. A cleaning liquid tank 47 feeds a cleansing agent such as heavy oil to the line 46 and it flows into the lines 20, 64 and 24 and the heat exchanger 60 to clean the feed line 20 and return line 24 as well as the heat exchanger 60. Consequently, it is possible to prevent troubles such as clogging of the lines and dropping of flow rate in the lines. In particular, the styrofoam melt L tends to be solidified and likely causes the clogging after the operation of the apparatus is stopped. The cleaning route made by the lines 46, 20, 64 and 24 can prevent or eliminate this problem.

Moreover, an LPG line 54 may be connected to the gas discharge line 21 of the gasifying unit 3 so that an LPG is also supplied to the gas burner as an auxiliary fuel. When an amount of gas G generated in the gasifying unit 3 decreases or is insufficient, the secondary fuel (LPG) complements it. This secondary fuel is also able to prevent the lines of the apparatus from becoming vacuum when the apparatus is stopped. Further, a vent line 53 may branch from the discharge line 21 so that an air in the apparatus is easily vented out of the apparatus. Before the apparatus is operated, the air ventilation or purging is occasionally required.

Figure 5:
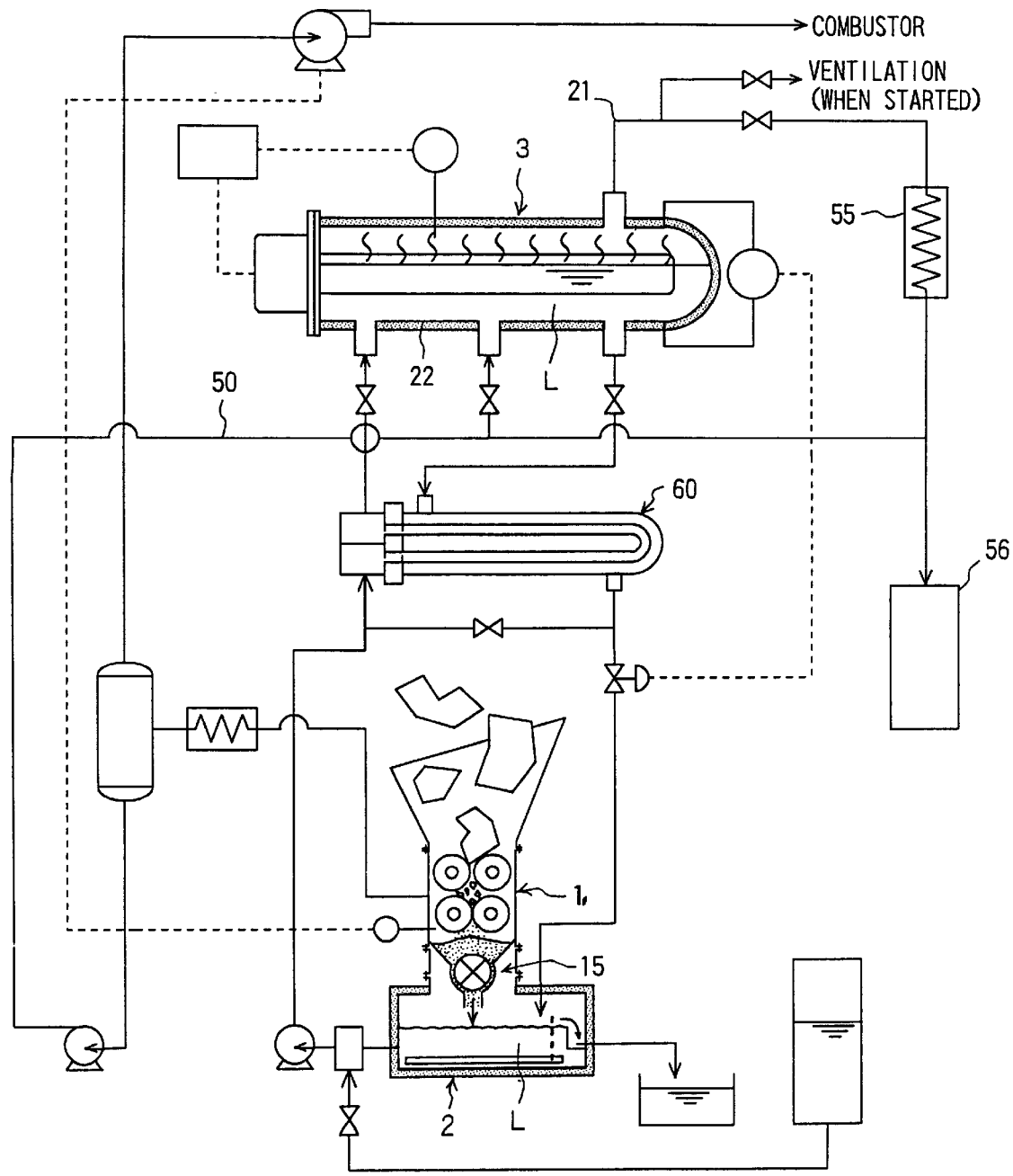
FIG. 5 illustrates the fourth embodiment of the invention.

Referring now to FIG. 5, the gas burner provided at the downstream end of the discharge line 21 of the gasifying unit 3 may be replaced with a gas cooler 55 and a styrofoam liquid tank 56. The combustible gas produced by the gasifying unit 3 is cooled by the cooler 55 and condensed to a styrofoam liquid. This liquid is stored in the tank 56, and may be used as a fuel when necessary. Thus, the gas cooler 55 and tank 56 serve as a recovering mechanism which recovers the styrofoam gas as a fuel oil. It should be noted that the high molecular bond of styrofoam melt L is disconnected or broken upon gasification and therefore the styrofoam gas is not solidified upon cooling but recovered as a liquid. Further, the liquid in the line 50 from the gas separator 48 has substantially the same composition as the liquid obtained at the cooler 55, and accordingly the line 50 may be connected to the line downstream of the gas cooler 55 to also shed the liquid of the line 50 into the tank 56.

Figure 6:
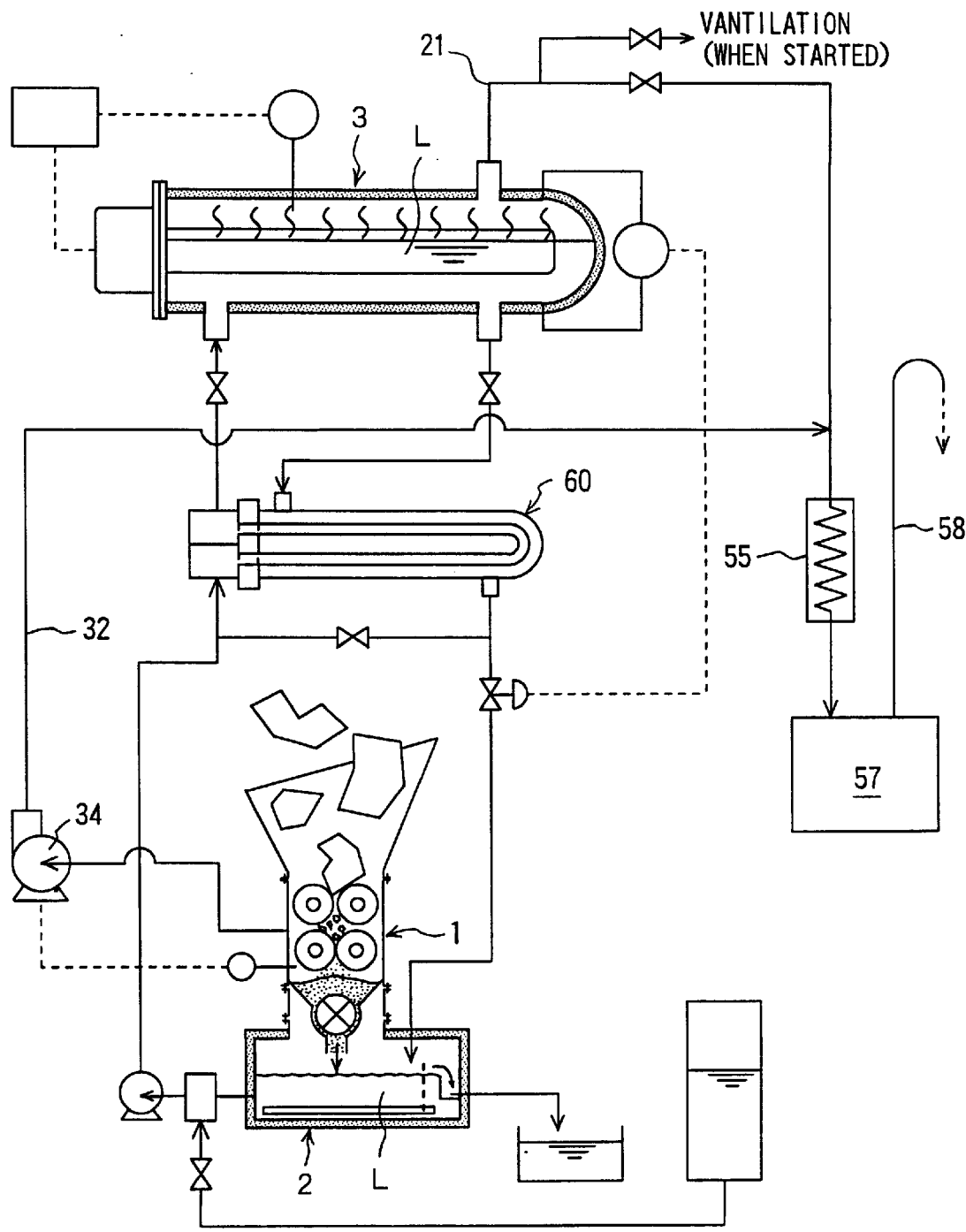
FIG. 6 illustrates the fifth embodiment of the invention.

Referring to FIG. 6, illustrated is a yet another modification according to the present invention. The discharge line 32 of the pulverizing unit 1 is directly connected to the discharge line 21 of the gasifying unit 3 upstream of the gas cooler 55. The combustible gas leaking into the pulverizing unit 1 is mixed with the gas G produced in the gasifying unit 3 and they are cooled and condensed by the gas cooler 55. The resulting styrofoam liquid is preserved in a tank 57. In this modification, therefore, the gas separator 48, gas cooler 49, branch line 50, pump 51 and gas combustor provided at the downstream end of the line 32 (FIGS. 4 and 5) are all dispensed with. Reference numeral 58 denotes a release line 58 extending from the tank 57 to expel an air and/or a small amount of combustible gas from the tank 57.

The above described apparatus and modifications are disclosed in Japanese Patent Application Nos. 10-176012 filed Jun. 23, 1998 and 10-298671 filed Oct. 20, 1998 and the entire disclosures thereof are incorporated herein by reference. The application claims priority of these two Japanese Applications.

What is claimed is:

1. An apparatus comprising:
   a pulverizing mechanism for pulverizing a lump of styrofoam to which non-meltable substances adhere, the pulverizing mechanism having a hopper into which the styrofoam is thrown;
   a constant volume feeder for receiving the pulverized styrofoam from the pulverizing mechanism and passing it therethrough in a constant volume at a time or within a predetermined period;
   a melting vessel for receiving the pulverized styrofoam from the constant volume feeder and heating and melting the pulverized styrofoam to obtain a styrofoam melt;
   a strainer for filtering the styrofoam melt to remove the non-meltable substances;
   a gasifying mechanism for further heating and vaporizing the filtered styrofoam melt to obtain a styrofoam gas;
   a gas cooler for cooling and condensing the styrofoam gas to obtain a liquid styrofoam; and
   a first discharge line for extracting a styrofoam gas leaking into the pulverizing mechanism from the melting vessel through the constant volume feeder.

2. The apparatus as defined in claim 1 further including a heat medium of high boiling point put in the melting vessel to quickly and uniformly heat the styrofoam in the melting vessel and to minimize vaporization of the styrofoam in the melting vessel.

3. The apparatus as defined in claim 2, wherein the heat medium of high boiling point is an A oil, a lubrication oil, a base oil for a lubrication oil, a flashing oil or a thermal oil or combination thereof.

4. The apparatus as defined in claim 1 further including a first feed line extending from the melting vessel to the gasifying mechanism for transferring the styrofoam melt to the gasifying mechanism from the melting vessel, and a return line extending from the gasifying mechanism to the melting vessel for feeding back the styrofoam melt to the melting vessel from the gasifying mechanism under a predetermined condition.

5. The apparatus as defined in claim 4 further including a heat exchanger located between the first feed line and return line for heat exchanging between the styrofoam melt flowing in the first feed line and that flowing in the return line.

6. The apparatus as defined in claim 4 further including a first level sensor for detecting a liquid level in the gasifying mechanism and a flow rate control valve provided on the return line for adjusting a flow rate of the styrofoam melt caused to return to the melting vessel based on the detected liquid level.

7. The apparatus as defined in claim 4 further including a second level sensor for detecting a liquid level in the melting vessel and a three-way valve provided on the return line for extracting part or all of the styrofoam melt caused to return toward the melting vessel based on the liquid level detected by the second level sensor.

8. The apparatus as defined in claim 4 further including a first branch line branching from the return line for extracting some of the styrofoam melt directed to the melting vessel and a solidifying mechanism for solidifying the extracted styrofoam melt to a solid styrofoam.

9. The apparatus as defined in claim 4 further including a bypass line extending to the return line from the first feed line, a tank for reserving a cleaning agent and a cleaning line extending to the first feed line from the tank for supplying the cleaning agent into the first feed line such that the cleaning agent flows through the cleaning line, first feed line, bypass line and return line in turn and returns to the melting vessel.

10. The apparatus as defined in claim 1 further including a first pressure gage for measuring a gas pressure in the gasifying mechanism, and a controller for adjusting a heating manner of the gasifying mechanism based on the measured gas pressure.

11. The apparatus as defined in claim 1 further including a weir for allowing part of the styrofoam melt to overflow from the melting vessel under a predetermined condition.

12. The apparatus as defined in claim 1 further including a second discharge line extending from the gasifying mechanism for extracting a combustible gas from the gasifying mechanism, and wherein the gas cooler is provided on the first or second discharge line for cooling and condensing the extracted combustible gas to obtain a liquid styrofoam.

13. The apparatus as defined in claim 12 further including a tank located downstream of the gas cooler for receiving the liquid styrofoam from the gas cooler.

14. The apparatus as defined in claim 1 further including a first combustor located in the melting vessel for combusting a combustible gas produced in the melting vessel and a third discharge line for expelling the combusted gas from the melting vessel.

15. The apparatus as defined in claim 1, wherein the melting vessel includes at least one heater for heating and melting the pulverized styrofoam and the gasifying mechanism includes at least one heater for heating and vaporizing the styrofoam melt.

16. The apparatus as defined in claim 1 further including a second combustor for combusting a combustible gas produced by the gasifying mechanism.

17. The apparatus as defined in claim 15 further including a supplementary fuel gas feeder for complementally feeding a fuel gas to the second combustor when the combustible gas fed to the second combustor from the gasifying mechanism is insufficient.

18. The apparatus as defined in claim 1 further including a second pressure gage for detecting an inner pressure of the pulverizing mechanism and wherein the first discharge line is caused to discharge a gas from the pulverizing mechanism when the inner pressure of the pulverizing mechanism detected by the second pressure gage exceeds a predetermined value.

19. The apparatus as defined in claim 1 further including a third combustor provided on the first discharge line for combusting the gas discharged from the pulverizing mechanism.

20. The apparatus as defined in claim 1 further including a condenser provided on the first discharge line for cooling the gas discharged from the pulverizing mechanism so that part or all of the gas is condensed, a gas separator provided on the first discharge line downstream of the condenser for separating the remaining gas from a resulting liquid, and a second feed line for feeding this liquid to the gasifying mechanism.

21. The apparatus as defined in claim 20 further including a fourth discharge line extending from the gas separator for discharging the gas from the gas separator and a fourth combustor provided on the fourth discharge line for combusting the gas discharged from the gas separator.

22. The apparatus as defined in claim 1 further including means for purging an air from the inside of the apparatus.

23. The apparatus as defined in claim 1 further including means for uniformly heating the inside of the melting vessel.

24. The apparatus as defined in claim 1 further including an opening formed in the melting vessel for allowing the solidified styrofoam ingot to be fed into the melting vessel therethrough.

* * * * *